Figure 1:
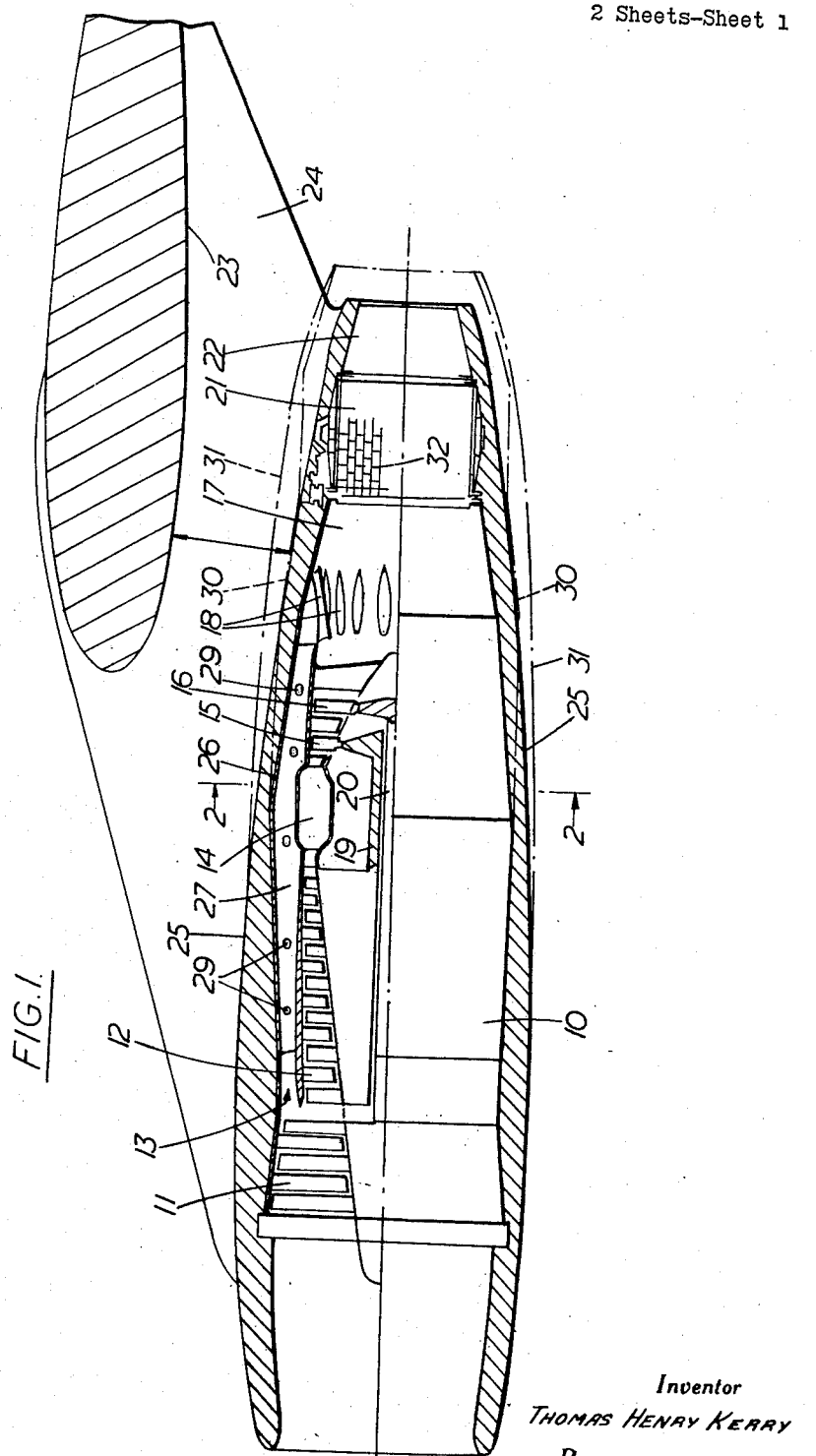

Sept. 25, 1962

T. H. KERRY
GAS TURBINE ENGINE 3,055,615

Filed Jan. 19, 1961

2 Sheets-Sheet 1

Inventor
THOMAS HENRY KERRY

By
Cushman, Darby & Cushman
Attorneys

Sept. 25, 1962     T. H. KERRY     3,055,615
GAS TURBINE ENGINE

Filed Jan. 19, 1961     2 Sheets-Sheet 2

Inventor
THOMAS HENRY KERRY
By
Cushman, Darby & Cushman
Attorneys

United States Patent Office 3,055,615
Patented Sept. 25, 1962

3,055,615
GAS TURBINE ENGINE
Thomas Henry Kerry, Derby, England, assignor to Rolls-Royce Limited, Derby, England
Filed Jan. 19, 1961, Ser. No. 83,716
Claims priority, application Great Britain Feb. 20, 1960
12 Claims. (Cl. 244—15)

This invention relates to a gas turbine engine of the kind known as a by-pass engine.

A by-pass engine comprises a low pressure compressor of which part of the output is fed into a high pressure compressor which delivers to combustion equipment, the hot gases then passing through turbines into a jet pipe having a propulsion nozzle. The remainder of the output from the low pressure compressor is fed into a by-pass duct, which, in known arrangements, runs concentrically with the high pressure compressor, combustion equipment, the turbines and jet pipe, but is separated from these parts by an annular wall.

It has been found that if a by-pass engine is designed to give greatly increased flow of by-passed air as compared with existing by-pass engines the outer wall of the by-pass duct has to be substantially increased in diameter.

Such an increase in diameter has the disadvantage that when the engine has to be installed in a pod mounted beneath an existing aircraft wing the ground clearance of the engine fairing structure is considerably reduced and the distance between the underside of the wing and the fairing structure is also reduced. It is well known with pod mounted engines that the distance between the underside of the wing and the external surface of the pod fairing structure is critical because if the distance is considerably reduced a substantial drag can be incurred on the aircraft.

As these two distances have been optimised on existing aircraft having pod mounted engines the introduction of a larger engine having a fully annular by-pass duct is prohibitive.

It is an object of the present invention to overcome the difficulties of installing one or more large by-pass engines in place of conventional by-pass engines in a pod mounted installation without having to introduce longer undercarriages on the aircraft for the purpose of increasing ground clearance.

Another object of the present invention is to overcome the difficulties of installing large by-pass engine in pods mounted on the aft end of an aircraft fuselage.

The difficulties associated with such installations are as follows. It is well known that in such pod mounting arrangements that the distance between the external surface of the pod fairing structure and the side of the aircraft fuselage is critical because if the distance is considerably reduced a substantial drag can be incurred on the aircraft.

In order to maintain this distance the same for a large by-pass engine as for a conventional by-pass engine the vertical centre line of the mounted large engine would have to be moved away from the centre line of the aircraft fuselage thereby resulting in a substantial increase in the length of the strut. This would of course result in an increase in weight which is undesirable.

In arrangements in which two or more engines are mounted side by side on a strut the length of the strut would have to be very greatly increased.

According to the present invention, in a by-pass gas turbine engine the outer wall of the by-pass duct is formed, in a transverse section, over a major part of its length by a pair of outwardly-convex arcs joined end to end, each arc being greater than a semicircle in extent, whereby the depth of the engine is reduced in the plane where the two arcs join as compared with the conventional circular by-pass wall.

Preferably the inner wall of said by-pass duct is fully circular, in a transverse section, about the longitudinal centre line of the engine.

In a preferred arrangement the engine is supported from an aircraft wing by means of a stream line strut and the said engine is encased in fairing structure.

Where the engine is supported from an aircraft wing by means of a stream line strut the pair of arcs intersect in a vertical plane so as to reduce the vertical depth of the engine.

The engine may be supported from support structure by a radial wall which is secured to the inner wall of the bypass duct and contacts the two arcuate portions of the outer wall where they are joined together.

The radial wall is preferably provided with apertures so as to equalise the gas pressures in each arcuate portion.

In an alternative arrangement the engine is mounted at the end of a strut supported from the aft end of an aircraft fuselage, the engine being encased in fairing structure.

When the engine is mounted at the aft end of an aircraft fuselage the pair of arcs intersect in a horizontal plane so as to reduce the width of the engine.

Where the engine is provided with thrust reverser means the said thrust reverser unit may be shaped, in a transverse section, in the same manner as the outer wall of the by-pass duct.

Each arcuate portion of the reverser unit may have its own control valve for closing off that portion of the jet pipe and deflecting the gas stream through apertures provided in the wall of the jet pipe, said apertures being closed by said control valves when not required for thrust reversal operation.

The by-pass duct may communicate with the interior of the jet pipe through a number of mixer chutes as described and claimed in the co-pending United States application of Thomas Henry Kerry, serially numbered 725,326 and filed August 18, 1958. Allowing the by-pass air to mix with the hot gases upstream of the propulsion nozzle results in an advantageous temperature and velocity of the mixed gas stream.

By shaping the outer wall of the by-pass duct in this manner results in an increase of the effective distance between the top outer surface of the fairing structure and the under surface of the wing in a pod mounted installation supported from an aircraft wing and it also increases the ground clearance of the fairing structure as compared with a fully annular by-pass duct of the same volume.

Also, when the engine is installed in a pod supported from the aft end of an aircraft fuselage the engine can be mounted with its vertical centre line in the same plane as a smaller diameter engine without decreasing the distance between the surface of the pod and the aircraft fuselage.

Where two or more engines are mounted in this manner the length of the strut will not have to be increased, thereby giving a saving in weight.

Figure 2:
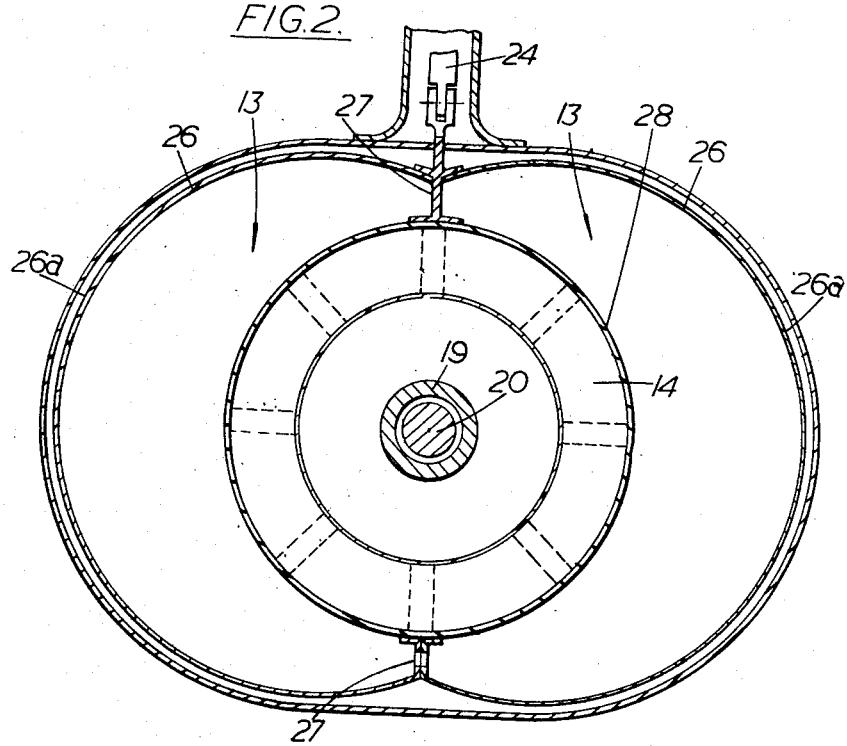
Figure 3:
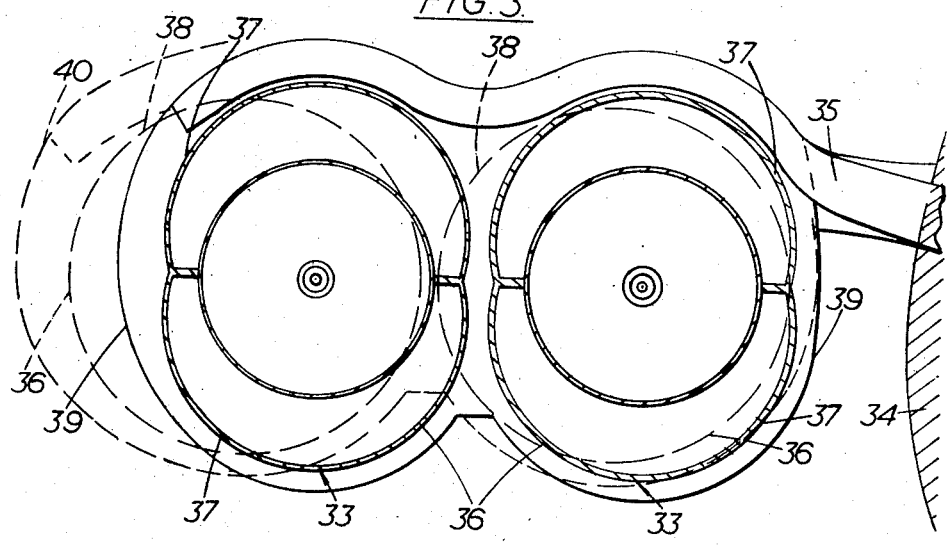

A by-pass engine embodying the present invention will now be described with reference to the drawings accompanying the specification in which:

FIGURE 1 illustrates the side elevation of a by-pass engine embodying the present invention, mounted in a pod supported from an aircraft wing the upper half of the engine being shown in section, FIGURE 2 is a transverse section on the line 2—2 indicated on FIGURE 1, and FIGURE 3 is a view similar to FIGURE 2 through a pair of engines mounted in a pod supported from the aft end of an aircraft fuselage.

The by-pass engine 10, shown in FIGURES 1 and 2 comprises a low pressure compressor 11 which delivers compressed air to a high pressure compressor 12 and also to a by-pass duct 13. The high pressure compressor 12 delivers compressed air to combustion equipment 14 where fuel is burned in the air, the products of combustion then passing through a high pressure turbine 15 and a low pressure turbine 16 to drive them before entering a jet pipe 17.

The by-pass air flowing through the by-pass duct 13 enters the jet pipe 17 through a number of mixer chutes 18. The chutes 18 may be of the type described and claimed in co-pending application serially numbered 725,326.

The high pressure turbine 15 drives the high pressure compressor 12 through a shaft 19 and the low pressure turbine 16 drives the low pressure compressor 11 through a shaft 20.

The jet pipe 17 is provided with a thrust reverser unit 21 and a final nozzle 22 from which the hot propulsive gases pass to atmosphere.

The by-pass engine 10 is supported from an aircraft wing 23 by means of a stream-line strut 24 and the engine 10 is encased in a sheet metal fairing structure 25.

As will be seen more clearly in FIGURE 2 of the outer wall 26 of the by-pass duct 13 is formed along part of its length by a pair of outwardly-convex arcuate portions 26a which are joined together in the vertical plane of the engine. At the intersection of the two arcuate portions 26a there are provided radially extending walls 27 which are secured to the inner circular wall 28 of the by-pass duct 13. Each radial wall 27 is provided with a number of apertures 29 which serve to equalise the gas pressure in each arcuate portion 26a. The radial wall 27 provided at the top of the engine is connected to the strut 24 in order to support the engine 10 from the strut.

The radial walls 27 act as torsion members and ensure that the internal gas pressure produces only simple tensile stresses in the arcuate portions 26a.

It will be clear that by shaping the outer wall 26 of the by-pass duct 13 in this manner the depth of the engine is considerably reduced as compared with a fully annular by-pass duct of the same volume. The chain dotted line 30, on FIGURE 1, indicates the diameter that the outer wall of the by-pass duct would have to be if it were made circular and the chain dotted line 31 indicates the depth that the fairing structure would have to be if the by-pass duct outer wall 26 was at that indicated at 30.

It will be clear that by extending the fairing structure 25 to the position indicated at 31, there will be a considerable decrease in the ground clearance of the fairing structure and also a considerable decrease in the distance between the under surface of the aircraft wing 23 and the top surface of the fairing structure 25.

By decreasing the distance between the under surface of the wing 23 and the top surface of the fairing structure 25 a substantial drag can be incurred on the aircraft. It is usual in a pod-mounted engine to maintain this distance and the ground clearance at a desired value and by shaping the outer wall 26 in the manner described a large by-pass engine may be installed in an aircraft in which the distances have been optimised for use with a smaller engine.

The thrust reverser unit 21 and the final nozzle 22 are shaped in a similar manner to the by-pass duct outer wall 26. The thrust reverser unit 21 has a control valve for closing off each portion of the jet pipe and the wall of the jet pipe 17 is provided with outlet apertures 32 which are closed by the control valves when reverse thrust operation is not required.

The operating mechanism for the control valves of the thrust reverser unit 21 is preferably mounted within the strut 24 and the various engine auxiliaries may be mounted within the strut in the manner described and claimed in my United States Patent No. 2,978,209, issued April 4, 1961.

In FIGURE 3 a pair of by-pass gas turbine engines 33 are mounted at the aft end of an aircraft fuselage 34 by means of a strut 35. The outer wall 36 of the by-pass duct of each engine 33 is formed by a pair of outwardly convex arcuate portions 37 which are joined together in the horizontal plane of the engine. Thus the width of the two engines 33 is smaller than if the outer walls 36 of the by-pass ducts were made circular as shown by the dotted line 38.

If the walls 36 were circular as shown at 38 the strut 35 and fairing structure 39 would have to be increased in length as indicated by the dotted line 40 and this would increase the weight of the installation.

By shaping the outer wall 36 in the manner described the engines 33 can be mounted on the same centre lines as smaller engines without decreasing the distance between the surface of the fuselage 34 and the fairing structure 39 surrounding the inboard engine 33.

The frontal area of the installation is also less than it would be if the walls 36 were circular.

What I claim is:

1. In combination: an aircraft; an improved power plant pod comprising a by-pass gas turbine engine including a casing having a jet pipe for discharging exhaust gases, compressor means, combustion means and turbine means arranged in flow series in said casing, a by-pass duct surrounding and extending longitudinally of at least a portion of said engine, said by-pass duct communicating with a portion of said compressor means and having an outer and an inner wall, said outer wall being formed of a pair of arcuate portions joined end to end along their longitudinal edges, said pair of arcuate portions having transverse sections along a major portion of their longitudinal lengths defined by a pair of outwardly convex arcs greater than a semicircle; and means to support said power plant pod in spaced relationship to a portion of said aircraft.

2. The combination of claim 1 wherein the inner wall of said by-pass duct is concentric of the longitudinal axis of said engine and is circular in transverse section.

3. The combination of claim 1 wherein said inner wall of said by-pass duct is defined by the exterior of said engine casing.

4. The combination of claim 1 wherein said support means includes a streamlined strut having one end fixedly secured to said aircraft and the other end fixedly secured to said power plant pod.

5. The combination of claim 1 including a radially extending wall secured to the inner wall of said duct and extending outwardly between said pair of arcuate portions along their juncture, and wherein said support means includes a streamlined strut fixedly secured at one end to said aircraft and at the other end to said radially extending wall.

6. The combination of claim 5 wherein said radial wall is provided with a plurality of apertures.

7. The combination of claim 1 including thrust reverser means provided at the aft end of said jet pipe, said thrust reverser means comprising members having a transverse section substantially identical to the transverse sections of said arcuate portion.

8. The combination of claim 1 including: a plurality of annularly spaced mixer chutes communicating the aft end of said by-pass duct with the interior of said jet pipe.

9. In combination: an aircraft having a wing and a fuselage; an improved power plant pod comprising a by-pass gas turbine engine including a casing having a jet pipe for discharging exhaust gases, compressor means, combustion means and turbine means arranged in flow series in said casing, a by-pass duct surrounding and extending longitudinally of at least a portion of said engine, said by-pass duct communicating with a portion of said compressor means and having an outer and an inner wall, said outer wall being formed of a pair of arcuate portions joined end to end along their longitudinal edges, said pair of arcuate portions having transverse sections along a major portion of their longitudinal lengths defined by a pair of outwardly convex arcs greater than a semicircle; a radially extending baffle wall in said duct and extending longitudinally of the same, said baffle wall having a plurality of longitudinally spaced apertures therein; and means to support said power plant pod in spaced relationship to a portion of said aircraft.

10. A combination of claim 9 wherein said means includes a streamlined strut fixed at one end to the wing of said aircraft and supporting said power plant pod at the other end thereof.

11. A combination of claim 9 wherein said support means includes a streamlined strut fixedly secured at one end to the fuselage of said aircraft and at the other end of said power plant pod.

12. The combination of claim 9 wherein said power plant pod has a major transverse axis and a minor transverse axis, said power plant pod being supported by said support means with its major axis extending substantially transverse of said support means.

References Cited in the file of this patent

UNITED STATES PATENTS

| | | |
|---|---|---|
| 2,512,794 | Goddard | June 27, 1950 |

FOREIGN PATENTS

| | | |
|---|---|---|
| 712,682 | Great Britain | July 28, 1954 |
| 1,150,625 | France | Aug. 12, 1957 |